July 12, 1966   R. R. COUNCILMAN ET AL   3,260,155
PROJECTOR SLIDE CHANGER AND SHUTTER CONTROL
Filed Aug. 6, 1964   2 Sheets-Sheet 1

RICHARD R. COUNCILMAN
ROLAND A. FREEMAN
SOL STROMBERG
INVENTORS

BY Robert M. Sperry

ATTORNEY

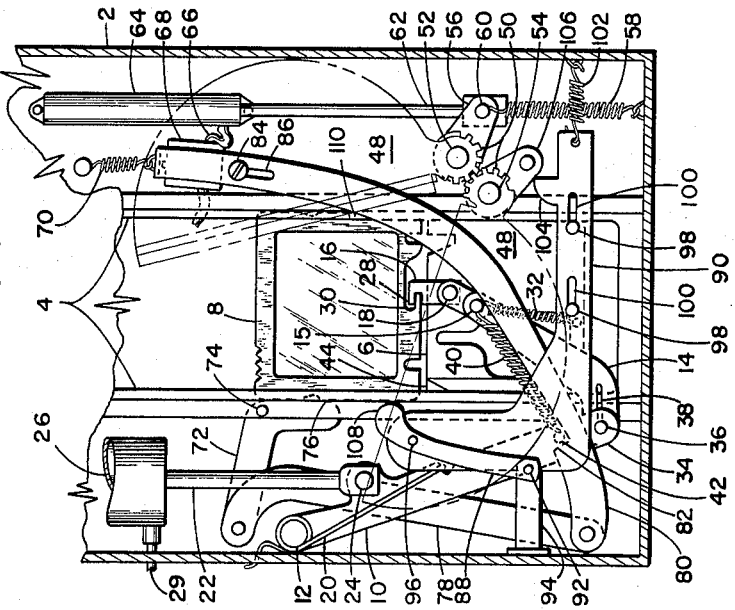

United States Patent Office 3,260,155
Patented July 12, 1966

3,260,155
PROJECTOR SLIDE CHANGER AND SHUTTER CONTROL
Richard R. Councilman, Garland, Roland A. Freeman, Arlington, and Sol Stromberg, Dallas, Tex., assignors to Ling-Temco-Vought, Inc., Dallas, Tex., a corporation of Delaware
Filed Aug. 6, 1964, Ser. No. 387,900
4 Claims. (Cl. 88—28)

This invention relates to slide projectors and is particularly directed to novel slide changing and shutter control mechanism for such projectors.

Automatic slide projectors have become quite popular in recent years and numerous types of mechanism have been proposed for changing slides and controlling the shutter. However, none of the prior art mechanisms have been entirely satisfactory. Most of the prior art devices are highly complex and expensive. Other devices are relatively simple in construction but provide a shutter control which is independent of whether or not a slide is in the projecting position and, hence, may provide an objectionable glare of bright light in the event the shutter is opened without a slide in the projecting position.

These disadvantages of the prior art are overcome with the present invention and novel slide changing and shutter control mechanism is provided which is extremely simple and inexpensive, yet assures smooth, rapid and accurate operation.

The advantages of the present invention are preferably attained by providing novel slide changing and shutter control mechanism comprising a projection slide having a locking recess formed in one side thereof, bell crank means having a hook portion engageable with said locking recess, guide means for guiding movement of said slide between a first position and a second position, an arm member, first link means connecting said arm member with said bell crank means, resilient means normally biasing said arm member to urge said slide to said first position, piston means actuable to cause said arm member to move said slide to said second position, shutter means movable between a light blocking position and a light passing position, means normally urging said shutter means to said light blocking position, second link means having a portion engageable by said arm member and being operable by said arm member to cause said shutter means to be moved to and from said light passing position, and trigger means responsive to absence of a slide in said guide members to move said second link means to a position where said arm member cannot engage said portion of said second link means.

Accordingly, it is an object of the present invention to provide novel slide changing and shutter control mechanism for slide projectors.

Another object of the present invention is to provide novel slide changing and shutter control mechanism which is simple and inexpensive, yet assures smooth, rapid and accurate operation.

A further object of the present invention is to provide novel slide changing and shutter control mechanism wherein the shutter operation is responsive to the absence of a slide.

A specific object of the present invention is to provide novel slide changing and shutter control mechanism comprising a projection slide having a locking recess formed in one side thereof, guide means for guiding movement of said slide between a first position and a second position, shuttle means movable between said guide means for carrying said slide, bell crank means pivotally mounted on said shuttle and having a hook portion engageable with said locking recess, an arm member, first link means connecting said arm member with said bell crank means, resilient means biasing said arm member to urge said shuttle to said first position, actuator means operable to cause said arm member to move said shuttle to said second position, shutter means movable between a light blocking position and a light passing position, means urging said shutter means to said light blocking position, second link means having a portion engageable by said arm member and being operable by said arm member to cause said shutter means to be moved to and from said light passing position, and trigger means responsive to absence of a slide in said guide members to move said second link means to a position where said arm member cannot engage said portion of said second link means.

These and other objects and features of the present invention will be apparent from the following detailed description taken with reference to the figures of the accompanying drawings.

In the drawings:

FIGURE 3 is a view of the mechanism of FIG. 1 with the parts shown in the lower position; and FIGURE 4 is a view of the lower portion of the mechanism of FIG. 1 with the parts shown in the lower position and having a slide positioned for projection.

Figure 1:
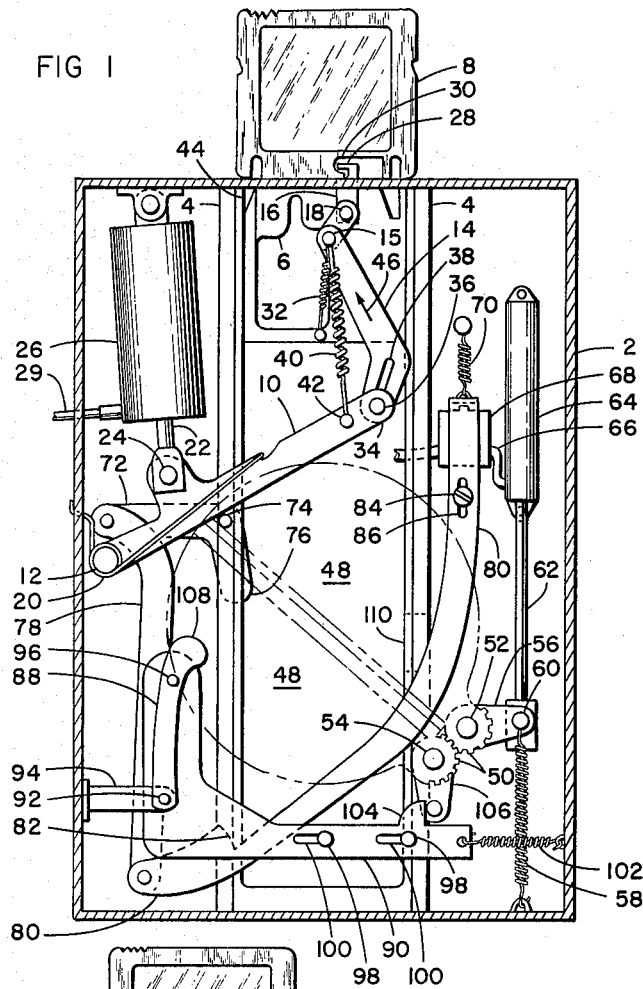
FIGURE 1 is a front elevation of slide changing and shutter control mechanism embodying the present invention with the parts shown in the raised position.
Figure 2:
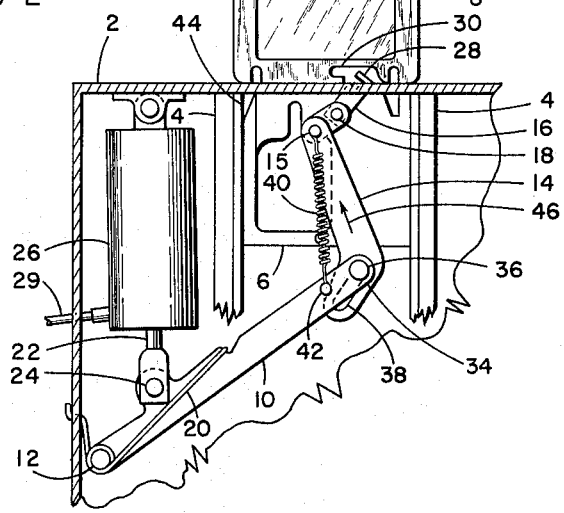
FIGURE 2 is a view of the upper portion of the mechanism of FIG. 1 with the parts shown in the slide releasing position.

In the form of the present invention chosen for purposes of illustration in the drawings, FIG. 1 shows a frame 2, which is part of a slide projector, and which has a pair of channel members 4 spaced apart to serve as guide means for a shuttle 6. The shuttle 6 cooperates with channel members 4 to transport a projection slide 8 between a raised or loading position, as seen in FIGS. 1 and 2, and a lower or projection position, as seen in FIG. 4. In operation, a plurality of slides are carried by a magazine mounted on top of the projector and suitable means is provided to move the slides into and out of the loading position. The apparatus for accomplishing this is not shown as it may be conventional and, in any event, forms no part of the present invention.

To actuate the shuttle 6, an arm member 10 is pivotally mounted on the frame 2, as by pin 12, and is coupled to the shuttle 6 by a link 14 which is connected by a pin 15 to the lower end of a bell crank 16 which is pivoted on the shuttle 6 by pin 18. Spring means 20 urges arm member 10 to its lower position while an actuator rod 22, coupled to arm member 10 by pin 24 and driven by actuator 26, serves to move arm member 10 to its raised position. As shown, actuator 26 is a pneumatic piston which is operated by air supplied thereto through hose 29 or the like. It is found that pneumatic pistons are more rapid and reliable and operate more smoothly than other types of actuating devices. However, it will be apparent that a solenoid or other actuating device could be employed, if desired.

The bell crank 16 is formed with a hook portion 28 adjacent the upper end thereof which is adapted to engage a recess 30 in the bottom of the slide 8 to secure the slide 8 to the shuttle 6 for movement therewith. A spring 32 is connected between pin 15 and the lower edge of the shuttle 6 to urge bell crank 16 to its slide engaging position. As best seen in FIGS. 1 and 2, end 34 of arm member 10 is connected to link 14 by a pin 36 which is slideable within a slot 38 formed in an angular extension of link 14. A spring 40 connects pin 15 with a pin 42 spaced slightly from end 34 of arm member 10 and serves to urge pin 36 toward the upper end of slot 38. To release the slide 8, stop means, such as inwardly projecting dog 44, formed on shuttle 6 engages the frame 2 to halt upward movement of the shuttle 6 before actuator rod 22 has reached the upper limit of its travel. The continued upward movement of rod 22 causes arm member 10 to drive link 14 axially, as indicated by arrow 46 in FIG. 2. This causes bell crank 16 to pivot clockwise about pin 18 and disengages hook portion 28 of bell crank 16 from the recess 30 in the slide 8, whereupon slide 8 is released. When actuator 26 is deenergized, spring 20 will drive arm member 10 downward and springs 32 and 40 will return bell crank 16 to its slide engaging position. If a slide is situated in the loading position when this occurs, hook portion 28 of bell crank 16 will engage recess 30 of this slide, securing the slide for movement with shuttle 6 in the manner described above.

A pair of generally semicircular shutter members 48 having intermeshing gear-like portions 50 are pivotally mounted by pins 52 and 54 to the frame 2 adjacent the lower end of one of the guide members 4. In addition, a crank member 56 is mounted on pin 52 and is movable to cause rotation of the gear-like portions 50 to open and close the shutter members 48. The shutter members 48 are normally urged to their open position by means of a spring 58 connected between a pin 60 adjacent the end of the crank member 56 and the bottom of the frame 2.

To close the shutter members 48, a piston 62 is connected to crank member 56 by pin 60 and an actuator 64 is provided to drive the piston 62. Any suitable type of actuator may be employed. However, as shown, actuator 64 is a pneumatic actuator operated by air supplied by hose 66 from a suitable source, not shown, through a valve 68 which is urged to the open position by a spring 70. In addition, a generally L-shaped trigger 72 is pivoted to one of the guide members 4, as indicated at 74, and has a portion 76 thereof projecting into a position where it will be engaged by a slide 8 carried by the shuttle 6, as seen in FIGS. 3 and 4. The trigger 72 is coupled to the valve 68 by a pair of link members 78 and 80. Link member 80 has an abutment 82 formed adjacent the lower end thereof for engagement by pin 42 of arm member 10, while the upper end of link member 80 slideably secured, as by pin 84 and slot 86, so as to move substantially vertically, in response to displacement of abutment 82 by pin 42 of arm member 10, to close valve 68. When no slide is carried by shuttle 6, spring 70 will urge valve 68 to its open position, allowing air to flow through hose 66 to actuator 64. This retracts piston 62 causing shutter members 48 to be moved to their closed position and causes link members 78 and 80 to assume the positions shown in FIGS. 1 and 3. In this condition, abutment 82 of link member 80 is located out of the path of movement of pin 42 of arm member 10. Thus, when spring 20 urges arm member 10 and shuttle 6 to the lower position, pin 42 will not engage abutment 82. Hence, valve 68 will remain open and air will be supplied through hose 66 to actuator 64, holding piston 62 in the retracted position and maintaining shutter members 48 in the closed position, as illustrated in FIG. 3. On the other hand, when a slide 8 is carried by the shuttle 6, the slide 8 will engage portion 76 of trigger 72, causing trigger 72 to rotate about pivot 74 and raising link member 80 to bring abutment 82 into the path of movement of pin 42 of arm member 10. Consequently, as arm member 10 approaches the lower end of its travel, pin 42 will engage abutment 82 and will displace link member 80, causing the upper end of link member 80 to be moved vertically downward to close valve 68. This shuts off the air from actuator 64 and allows spring 58 to pull crank 56 downward, rotating gear portions 50 and moving shutter members 48 to the open position, as seen in FIG. 4.

To assure uniform and accurate positionining of the slide 8, a lever 88 and L-shaped member 90 are provided. The lever 88 has the lower end thereof pivoted as by pin 92, to a stationary portion of the frame 2, such as bracket 94, and is pivoted, by pin 96, to L-shaped member 90 at a point spaced from the upper end of lever 88. The L-shaped member 90 is slideably mounted, by pins 98 and slots 100, adjacent the lower end of the guide members 4 and is urged by spring 102 to its right-hand position, as seen in FIG. 4. In addition, a projection 104 is formed on L-shaped member 90 and is engaged by a crank 106 which is mounted on pin 54 and is rotatable upon opening of the shutter numbers 48 to drive L-shaped member 90 to its left-hand position, as seen in FIGS. 1 and 3. When no slide is carried by shuttle 6, the shutter members 48 will remain closed, as discussed above and illustrated in FIGS. 1 and 3. In this condition, crank 106 will bear against projection 104, driving L-shaped member 90 to its left-hand position and causing lever 88 to assume a substantially vertical position, as illustrated in FIGS. 1 and 3. However, when a slide 8 is carried by shuttle 6, the shutter members 48 will be opened, as described above and shown in FIG. 4. When this occurs, crank 106 will be rotated away from projection 104 allowing spring 102 to pull L-shaped member 90 to its right-hand position. This causes lever 88 to pivot about pin 92 and causes projection 108 at the upper end of lever 88 to bear against one side of slide 8, urging the slide 8 firmly against a positioning stop 110 carried by the guide member 4 on the opposite side of slide 8. This assures accurate and uniform positioning of the slide 8 during projection.

Numerous variations and modifications may, obviously, be made without departing from the present invention. Accordingly, it should be clearly understood that the form of the invention described above and shown in the figures of the accompanying drawings is illustrative only and is not intended to limit the scope of the present invention.

What is claimed is:

1. Slide changing and shutter control mechanism for slide projectors comprising:
    a projection slide having a locking recess formed in one side thereof,
    guide means for guiding movement of said slide between a first position and a second position,
    shuttle means movable between said guide means for carrying said slide,
    bell crank means pivotally mounted on said shuttle and having a hook portion engageable with said recess,
    an arm member,
    first link means connecting said arm member with said bell crank means,
    resilient means biasing said arm member to urge said shuttle to said first position,
    actuator means operable to cause said arm member to move said shuttle to said second position,
    shutter means movable between a light blocking position and a light passing position,
    means urging said shutter means to said light passing position,
    second link means having a portion engageable by said arm member and operable by said arm member to cause said shutter means to be moved to and from said light blocking position, and
    trigger means responsive to presence of a slide in said guide means to move said second link means to a position where said arm member can engage said portion of said second link means.

2. Slide changing and shutter control mechanism for slide projectors comprising:
    a projection slide having a locking recess formed in one side thereof,
    guide means for guiding movement of said slide between a first position and a second position,
    shuttle means movable between said guide means for carrying said slide,
    bell crank means pivotally mounted on said shuttle and having a hook portion engageable with said recess, an arm member,
first link means connecting said arm member with said bell crank means,
resilient means biasing said arm member to urge said shuttle to said first position,
pneumatic actuator means operable to cause said arm member to move said shuttle to said second position,
means for permitting continued movement of said arm member after said shuttle has reached position to cause said bell crank means to disengage said hook portion from said slide,
means urging said hook portion of said bell crank to its slide engaging position,
shutter means movable between a light blocking position and a light passing position,
means urging said shutter means to said light passing position,
second link means having an abutment formed thereon engageable by said arm member and displaceable by said arm member to cause said shutter means to be moved to and from said light passing position,
means normally positioning said second link means at a location wherein said abutment cannot be engaged by said arm member, and
trigger means having a portion projecting into the path of movement of a slide carried by said shuttle and displaceable by such slide to move said second link to a location wherein said abutment can be engaged by said arm member.

3. Slide changing and shutter control mechanism for slide projectors comprising:
a projection slide having a locking recess formed in one side thereof,
guide means for guiding movement of said slide between a first position and a second position,
shuttle means movable between said guide means for carrying said slide,
bell crank means pivotally mounted on said shuttle and having a hook portion engageable with said recess,
an arm member,
first link means connecting said arm member with said bell crank means,
resilient means biasing said arm member to urge said shuttle to said first position,
first pneumatic actuator means operatble to cause said arm member to move said shuttle member to said second position,
means for permitting continued movement of said arm member after said shuttle has reached said second position to cause said bell crank means to disengage said hook portion from said slide,
means urging said hook portion of said bell crank to its slide enagaging position,
shutter means movable between a light blocking position and a light passing position,
means urging said shutter means to said light passing position,
second pneumatic actuator means for moving said shutter means from said light passing position to said light blocking position,
second link means having an abutment formed thereon engageable by said arm member and displaceable by such slide to move said second link to a location wherein said abutment can be engaged by said arm member.

4. The apparatus of claim 3 and further comprising:
lever means engageable with a slide in said first position to assure proper positioning of said slide,
means urging said lever means to its slide engaging position, and
means operable upon movement of said shutter means to said light blocking position to cause said lever means to disengage said slide.

References Cited by the Examiner
UNITED STATES PATENTS

| | | | |
|---|---|---|---|
| 2,748,653 | 6/1956 | Pollan et al. | 88—27 |
| 2,960,004 | 11/1960 | Jungjohann | 88—26 X |
| 3,180,212 | 4/1965 | Hillegonds et al. | 88—28 |
| 3,204,522 | 9/1965 | Wadsworth | 88—28 X |

NORTON ANSHER, *Primary Examiner.*

VANCE A. SMITH, *Assistant Examiner.*